Sept. 2, 1930.    J. A. WATSON ET AL    1,775,076
FRICTION TESTING DEVICE FOR ROTATING MEMBERS
Filed Aug. 6, 1928    2 Sheets-Sheet 1

Inventors
J. A. Watson
L. E. Miller
By Clarence A. O'Brien
Attorney

Sept. 2, 1930.   J. A. WATSON ET AL   1,775,076
FRICTION TESTING DEVICE FOR ROTATING MEMBERS
Filed Aug. 6, 1928   2 Sheets-Sheet 2
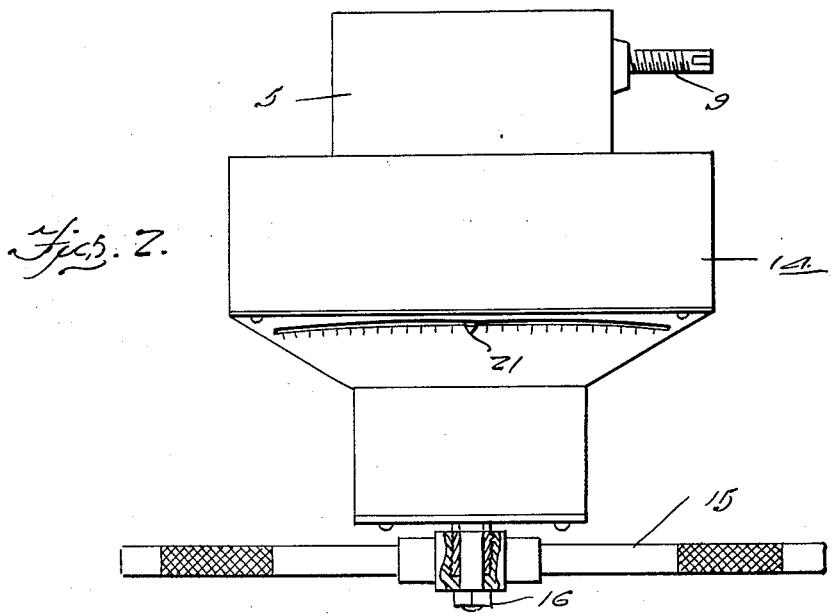
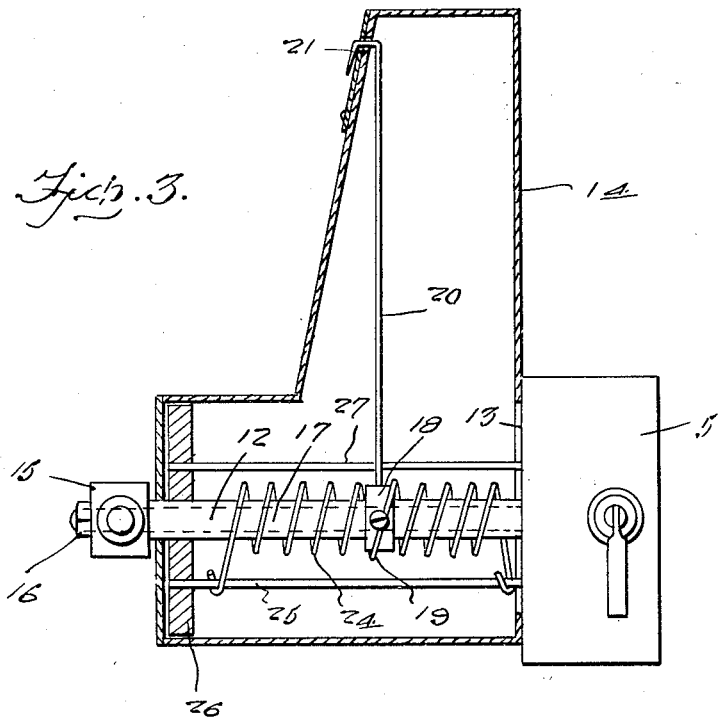
Inventors
J. A. Watson
L. E. Miller
By Clarence A. O'Brien
Attorney Patented Sept. 2, 1930

1,775,076

UNITED STATES PATENT OFFICE

JOHN A. WATSON AND LAURENCE E. MILLER, OF PAXTON, ILLINOIS; SAID MILLER ASSIGNOR TO SAID WATSON

FRICTION-TESTING DEVICE FOR ROTATING MEMBERS

Application filed August 6, 1928. Serial No. 297,768.

The present invention relates to friction testing devices adapted particularly for use in the testing of the frictional gripping engagement of vehicle wheel brake bands and to also employ the principles embodied in the invention for determining the extent of friction present during the rotation of a shaft or other rotatable member and constitutes an improvement over the invention covered in our copending application Serial No. 276,283, filed May 9, 1928.

In our prior application the construction of the device is permitted for the testing of friction present in rotating members and was adapted for use only upon members rotating in one direction.

The present structure provides means for indicating the amount of friction present in such member when rotating in either direction.

The invention further comprises the novel details of construction, operation and arrangement of the parts as more fully hereinafter described and claimed, reference being had to the accompanying drawings forming part hereof, in which:

Figure 2 is a top plan view,

Figure 3 is a longitudinal sectional view through the casing for the indicating arm.

Figures 1, 4:
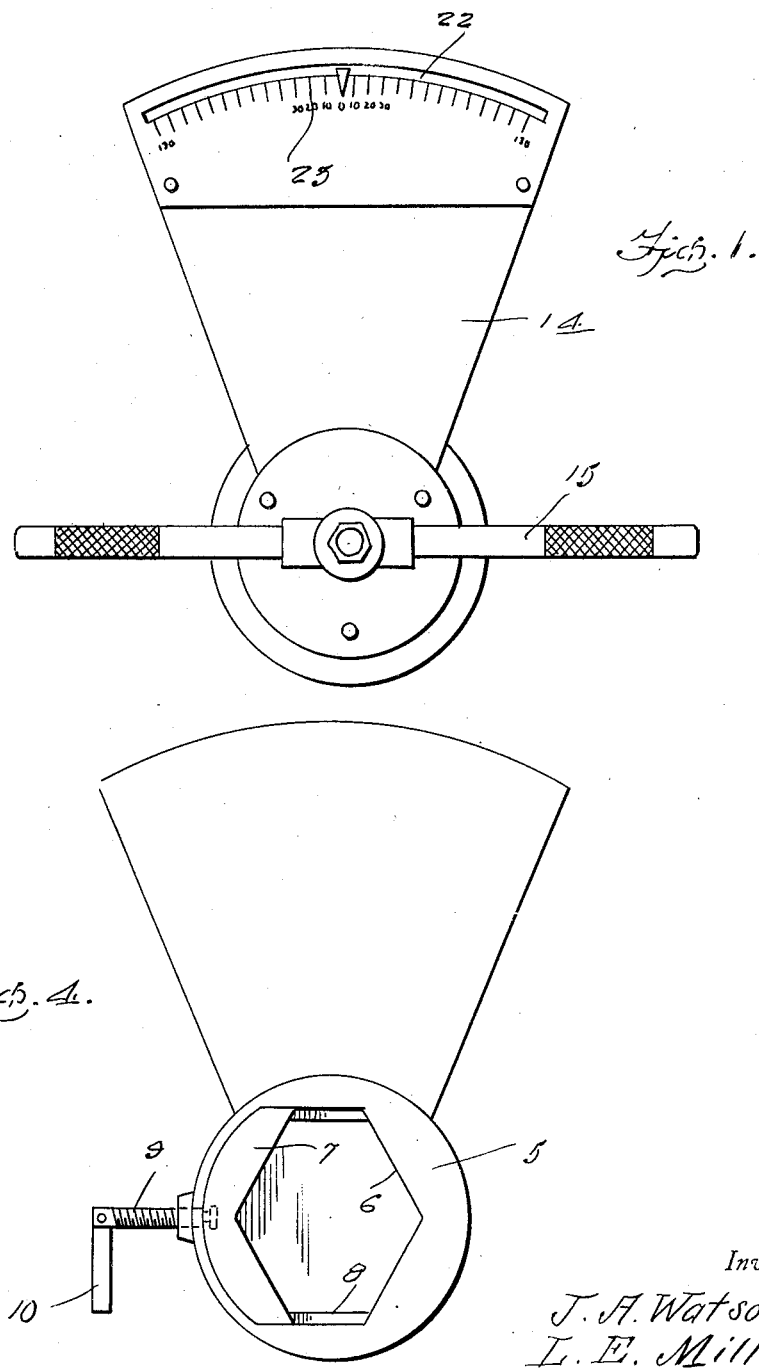
Figure 1 is a front elevational view.
Figure 4 is a rear elevational view showing one type of rotating member clamping chuck.

Referring now to the drawings in detail, wherein for the purpose of illustration we have disclosed a preferred embodiment of the invention, the numeral 5 designates a chuck of annular formation having an opening formed at the center thereof with its walls 6 angularly disposed and with a movable clamping head 7 slidably disposed at one side of the opening in guide 8 disposed at opposite sides of the opening.

The clamping head 7 is operable by a screw 9 screw threaded through the wall of the chuck with its inner end secured to the head and its outer end provided with a handle 10.

The clamping head 7 is adapted to secure a shaft or other rotatable member within the opening formed in the chuck 5. To the side of the chuck 5, opposite from its shaft attaching end, is a shaft 12 extending through an opening 13 formed in one of the walls of an indicator housing 14 and outwardly through the opposite wall of said housing.

A handle 15 is freely disposed on the outer end of the shaft for free rotary movement and is retained in position thereon by means of the nut 16 threaded on the end of the shaft. A sleeve 17 is disposed about the shaft 12 for independent rotation with respect thereto and with the handle rigidly secured at one end of the sleeve.

A collar 18 is secured to the sleeve intermediate its ends by means of a set screw 19, said collar having an indicating arm 20 extending from one side thereof and provided with an indicating finger 21 at its outer end which is bent angularly with respect to the arm and inserted through an arcuate slotted opening 22 formed in the upper end of the indicator housing.

The edge of the opening at the outer side of the housing is formed with a shield 23 graduating upwardly from each side of the center of such opening. A coil spring 24 is disposed about the sleeve 17 with one of its convolutions intermediate its ends secured to the collar by the set screw 19.

The opposite ends of the coil springs are attached to a rod 25 disposed parallel with the sleeve, said rod being rigidly attached at one end to the chuck 5 and at its opposite end to a disk 26 rotatably supported on the sleeve within the housing.

A rod 27, similar to the rod 25 is disposed diametrically opposite from the sleeve with its end likewise secured respectively to the chuck and the disk and adapted to operate as a brace for the disk against the tension of the spring.

In the operation of the device, the chuck 5 is secured to the shaft or other rotating member by means of the clamp 7 and it will be apparent that the amount of friction present in the rotation of the shaft will be determined by the extent of movement of the indicating finger 21 through the turning of the shaft by the handle 15.

If such rotating member is free from any frictional engagement, the indicating finger 21 will remain stationary with respect to the indicating scale 23.

However, should any frictional engagement be present during the rotation of the member, a greater force will be required to turn such member through the handle 15 and such added force will be applied to the spring 24 and the amount of force required to rotate the shaft or other rotating member secured to the chuck will be registered proportionately by the indicating finger 21.

It will be apparent that the device is equally well adapted for indicating the amount of friction present upon the shaft when turned in either direction.

It is obvious that our invention is susceptible of various changes and modifications in construction without departing from the spirit of the invention or the scope of the appended claims, and we accordingly claim all such forms of the device to which we are entitled.

Having thus described our invention, what we claim as new is:

1. A friction indicating device for rotating members comprising a clamping member for engaging said rotating member, a supporting member carried by said clamping member and having an operating handle freely supported at one end, a sleeve freely mounted on the supporting member and rigidly secured to the handle, an indicating finger attached to said sleeve and spring means connecting the sleeve with said clamping member and operable to form a yieldable connection between the handle and said clamping member.

2. A friction indicator for rotating members comprising a clamping member attachable to said rotating member, a supporting member extending axially from said clamping member, a sleeve freely mounted on said supporting member, an operating handle rigidly attached to said sleeve, an indicating finger extending radially from said sleeve and spring means yieldably connecting said sleeve with said clamping member and tensionally responsive to relative movement between the sleeve and the clamping member upon the turning of the handle in either direction.

3. A friction indicator for rotating members comprising a clamping member for said rotating member having a shaft extending from one side in longitudinal alinement with the rotating member, an indicating housing forming a support for one end of the shaft, a sleeve freely mounted on said shaft, an operating handle for the sleeve disposed outwardly of the housing, a collar secured to the sleeve intermediate its ends having an indicating arm extending radially of the sleeve, a coil spring disposed about the sleeve having one of its convolutions intermediate its ends fixedly secured to said collar, means carried by the clamping member forming an attachment for the opposite ends of said spring, said spring forming a yieldable connection between the handle and the clamping member and adapted to respond uniformly to force applied to the handle in turning said clamping member.

4. A friction indicating device for rotating members comprising a clamping member for removable attachment to the rotating member, a shaft fixedly carried by the member, a handle freely supported by the shaft, a tubular member freely carried by the shaft, means connecting the tubular member and the handle for unitary movement, an indicator secured to the tubular member for indicating the extent of movement thereof, a yieldable member attached intermediate its ends in the tubular member and attaching means for the ends of the yieldable member rigidly secured to said clamping member and movable about the axis of said tubular member.

5. A friction indicating device for rotating members comprising a clamping member for removable attachment to the rotating member, a shaft fixedly carried by the member, a handle freely supported by the shaft, a tubular member freely carried by the shaft, means connecting the tubular member and the handle for unitary movement, an indicator secured to the tubular member for indicating the extent of movement thereof, a yieldable member attachable at a point intermediate its ends for unitary movement with the tubular member and means rigidly carried by the clamping member and movable about the axis of the tubular member and adapted for attaching the opposite ends of said yieldable member thereto whereby to provide a plurality of yieldable connections between the clamping member and said tubular member.

6. A friction indicating device for rotating members comprising a clamping member for removable attachment to the rotating member, a shaft fixedly carried by the member, a handle freely supported by the shaft, a tubular member freely carried by the shaft, means connecting the tubular member and the handle for unitary movement, an indicator secured to the tubular member for indicating the extent of movement thereof, a yieldable member attachable at a point intermediate its ends for unitary movement with the tubular member, a disk member rotatably supported on said tubular member, rods connecting the disk with the clamping member and adapted for movement of the axis of the tubular member, said rods providing attaching means for the opposite ends of said yieldable member whereby to provide a plurality of yieldable connections between the clamping member and said tubular member.

In testimony whereof we affix our signatures.

JOHN A. WATSON.
LAURENCE E. MILLER.